United States Patent [19]
Lohr

[11] 3,840,849
[45] Oct. 8, 1974

[54] VEHICLE SEAT BELT WARNING SYSTEM
[75] Inventor: Thomas E. Lohr, Lexington, Ky.
[73] Assignee: Allied Chemical Corporation, New York, N.Y.
[22] Filed: May 10, 1973
[21] Appl. No.: 359,143

Related U.S. Application Data
[63] Continuation-in-part of Ser. No. 158,920, July 1, 1971, abandoned.

[52] U.S. Cl. ........... 340/52 E, 340/278, 307/10 SB, 180/82 C
[51] Int. Cl. ........................................... B60r 21/10
[58] Field of Search ....... 340/52 E, 278; 307/10 SB; 180/82 C

[56]  References Cited
UNITED STATES PATENTS
| | | | |
|---|---|---|---|
| 3,074,055 | 1/1963 | Rudolph et al. | 340/278 |
| 3,133,277 | 5/1964 | Hood | 340/52 E X |
| 3,269,483 | 8/1966 | Garner, Jr. | 340/278 X |

Primary Examiner—Alvin H. Waring
Attorney, Agent, or Firm—Clayton Smith; John P. Kirby, Jr.; Jonathan Plaut

[57] ABSTRACT

A vehicle safety seat belt warning system comprising, in combination, a buckle with slot for receiving a tongue in locking engagement, which tongue upon insertion into the buckle actuates a single pole, two position electric switch within the buckle from a first closed circuit position to an open circuit position and from a second open position momentarily to a closed circuit position. The switch is in a circuit which includes three flexible conductors preferably embedded in the belt or flexible band attached to the buckle, at least one additional switch, at least one electrically operated signal device, and a source of electrical energy, whereby, when an additional switch such as a vehicle's ignition switch is turned on, and the seat buckle is not in locked engagement with the tongue, this unlocked condition of the seat belt will be indicated by the signal device.

11 Claims, 9 Drawing Figures

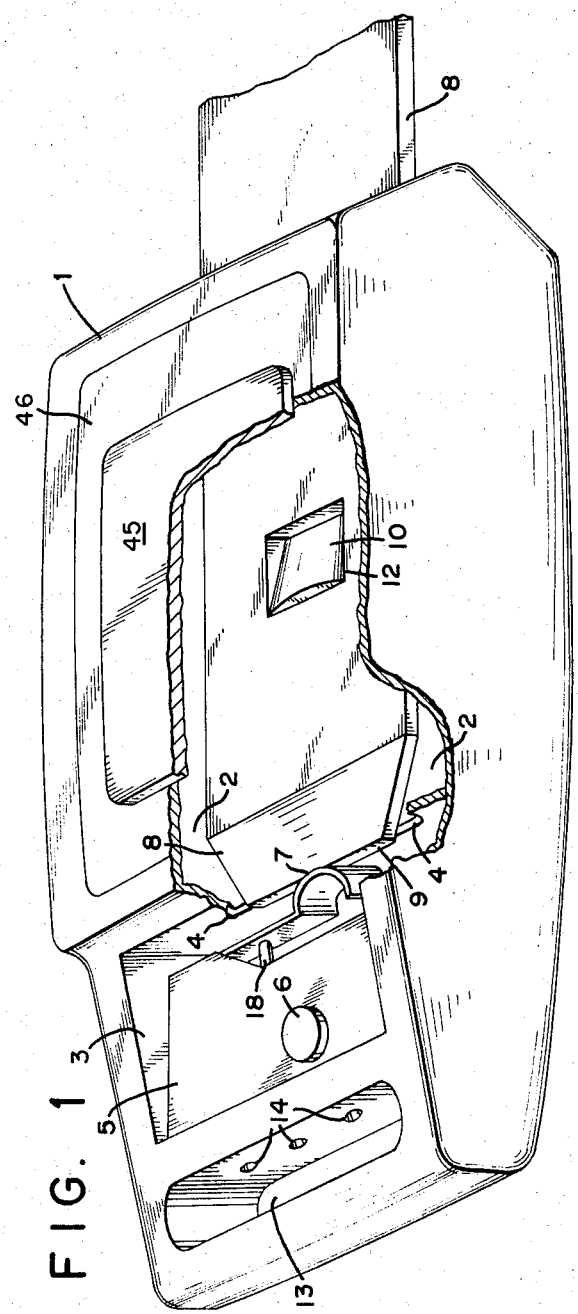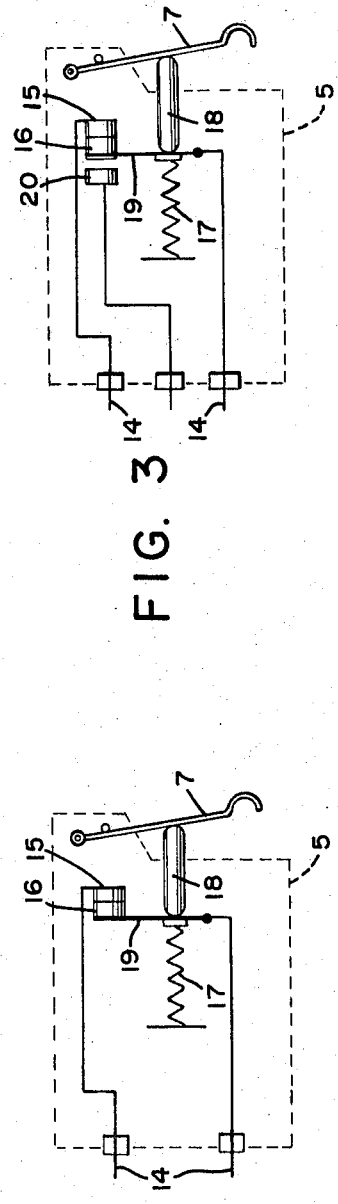

3,840,849

VEHICLE SEAT BELT WARNING SYSTEM

CROSS-REFERENCE TO RELATED APPLICATION

This application is a continuation-in-part of my co-pending commonly assigned application Ser. No. 158,920, filed July 1, 1971, and now abandoned.

BACKGROUND OF THE INVENTION

This invention relates to a warning system having particular application for seat belt and harness assemblies of the type utilized in automobiles for retaining an occupant in seated position within the automobile at the moment he or she is exposed to the forces which develop when the automobile is involved in an accident, such as a collision. The protective value of such safety belts and harness assemblies is beyond question but their protection obviously depends on their being used.

Many individuals forget to use them. Some drivers are reluctant to insist that their passengers use them, and many individuals consider them a nuisance and deliberately ignore them.

It is an object of the present invention to provide a signal device which will alert the driver if he or any of his passengers are not strapped in. It is also an object of the present invention to provide an alert which is sufficiently irritating to induce the "slightly disinclined" to "buckle up."

Briefly, when an automobile's ignition is turned on and anyone seated in the vehicle has not latched his seat buckle or harness assembly, a signal device such as a dash board light or an electric sounder will warn the driver of this fact. This obviously provides the excuse some drivers require, in order to insist that their passengers fasten their seat belts.

DESCRIPTION OF THE PRIOR ART

Most modern seat belts are retractable having take-up reels of one design or another. Most warning signals are activated by electric switches which are built into these take-up reels; thus, when a certain amount of the belt is withdrawn from the take-up reel the system "assumes" that the belt is being properly used and the switch is placed in open position cutting off the signal. It can be seen then that if the belt is withdrawn and knotted to prevent retraction, the system becomes inoperative. Other warning systems have been suggested, but have not met with substantial commercial success.

SUMMARY OF THE INVENTION

In the case of the present invention, the electrically operated signal is included within a circuit which is normally closed when the passenger is seated, and a switch such as the ignition switch is turned on. When the last seat belt buckle corresponding to an occupied seat is latched, a single pole, two position switch contained therein is automatically opened, breaking the circuit, and disconnecting the warning signal. The second position of the switch which is normally in an open circuit position is simultaneously, but only momentarily, moved to the closed position. This second position of the switch, in one embodiment, signals the driver that the specific seat belt buckle containing the switch is being latched. In another embodiment, this second position of the switch is used to set a timing mechanism to actuate the electrically operated signal after a selected period of time. The intended purpose of this arrangement is to thwart the practice of placing the seat belt out of service by buckling the belt behind the passenger. If desired, both embodiments can be combined in a single system.

The seat belts corresponding to unoccupied seats do not affect the system, as each seat cushion contains in series with its corresponding buckle switch a normally open pressure sensitive switch that only moves to its closed position when the seat is occupied.

The objects and advantages of the system of the present invention may be better understood by reference to the following detailed description when considered in connection with the accompanying drawings.

DESCRIPTION OF THE DRAWINGS

FIG. 1 is an enlarged perspective breakaway view showing a seat belt buckle in latched position with an apertured tongue which has placed an electric switch contained within the buckle housing into an open position.

FIG. 2 is a diagrammatic representation of the electric switch positioned in the buckle housing, having its contact points in closed position.

FIG. 3 represents a variation of the switch of FIG. 2 in which a third contact point has been included.

Referring now to the drawings wherein like numerals indicate like or corresponding parts throughout the several views, the embodiments are disclosed:

Figure 4:
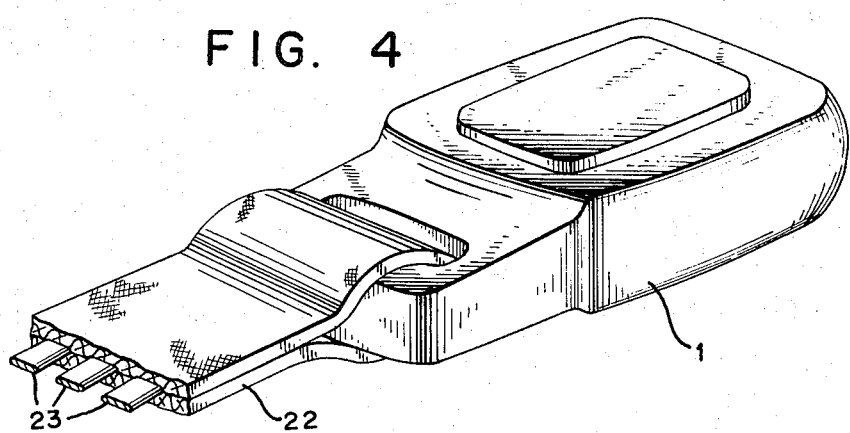
FIG. 4 is an enlarged perspective view of the seat belt buckle and an attached section of the belting which carries flexible leads to the buckle by which means it is included in the circuit of the warning signal system.

Referring to the drawing of FIG. 1, the buckle assembly as illustrated comprises a buckle housing 1 containing cavities 2 and 3 which communicate by means of slot 4. Apertured tongue 8 is shown inserted within the buckle housing. In the illustration the tongue is in latched position with latch 10 extending up into aperture 12 of the tongue, thus locking the tongue into position. When so latched, the leading edge 9 of tongue 8 extends through slot 4 from cavity 2 to cavity 3. Electric switch 5 is fixedly positioned within cavity 3 by rivet 6, the biased actuating lever 7 pressed against the leading edge of tongue 8 in which position said switch is in open position.

Opening 13 extends through the housing to accept the flexible seat belt 22. Points 14 represent flexible leads from the switch which connect with corresponding flexible conductors 23 (FIG. 4) embedded in the seat belt. Three leads rather than two would normally be used with the dual-position switch of FIG. 3. To complete the illustration, 45 represents the top of a push button for releasing the tongue, which push button is accessible through a corresponding aperture in cover plate 46. The cover plate for cavity 3 is not shown.

FIG. 2, a diagrammatic representation of switch number 5 of FIG. 1, contains two electric contacts, 15 and 16, which are urged into contact by biasing means 17. Pressure on actuating lever 7, when applied by the leading edge 9 of tongue 8, moves slideably disposed pin 18 inwardly against the pressure of biasing means 17 and thereby moves a lever 19 and contact point 16 attached thereto away from contact point 15, thus opening the circuit. The contact points 15 and 16 which break and make the circuit as the tongue is inserted or released from the buckle housing are connected to flexible leads 14 which are connected in turn to the flexible conductors 23 embedded in the belt.

FIG. 3 is identical to FIG. 2 and operates in an identical manner with the exception that a third contact point 20 is included which is only contacted momentarily by contact point 16 when the tongue is first inserted into the buckle housing and momentarily passes the latch position by the fractional part of an inch.

FIG. 4 merely illustrates the manner in which the belt is attached to the belt buckle and specifically by means of a cross-sectional view of the belt shows the cross-section of the three embedded flexible conductors 23 which lead to and from switch 5 through connectors 14. Of course, if the two-contact switch of FIG. 2 is employed, two flexible conductors are embedded in the belt rather than three.

Figure 5:
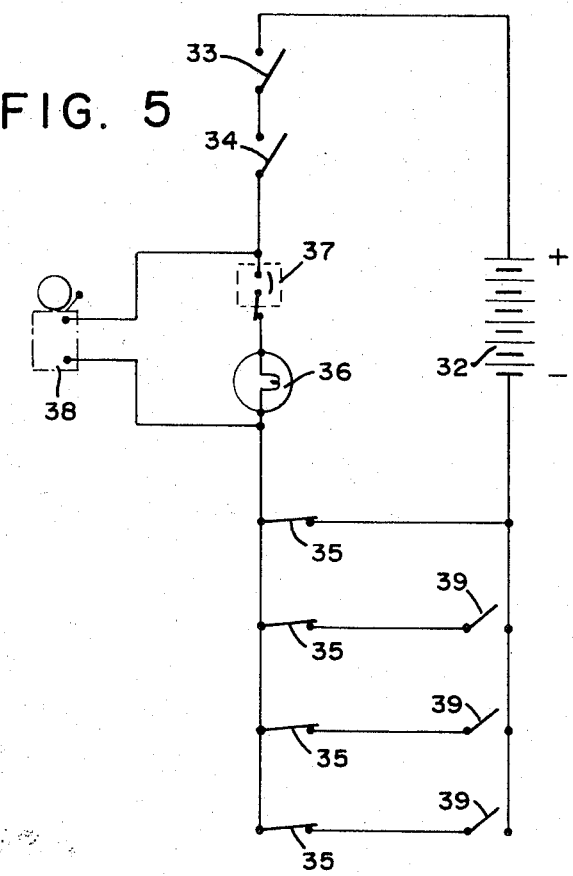
FIG. 5 is an electric circuit diagram showing the manner in which the various components of the system cooperate.

FIG. 5 illustrates by circuit diagram, one way in which various components may be arranged to provide a warning system. The source of electrical energy 32 is shown as a conventional 12-volt storage battery. The vehicle's ignition switch is shown as 33, while 34 represents an electric switch connected to the vehicle's torque converter in such a manner that when the torque converter is placed in a driving position, the switch is closed. Either of these switches may be employed independently, or they may be employed in series. A plurality of seat buckle switches 35 are shown in closed position indicating that none are buckled in this particular illustration. Switches 39 represents a plurality of pressure sensitive switches, each being connected in series with a corresponding seat buckle switch 35. These switches are shown in open position as they would normally be when unloaded. These switches are closed by the pressure applied by a seated occupant. Obviously, no such switch is needed for the driver's seat. One or more signal devices may be included in the circuit. In this diagram, 36 represents a dash board light which would remain lighted after the ignition switch 33 is turned on, the torque converter switch 34 is placed in closed position (if said switch is included in the circuit), the pressure sensitive switch 39 is closed as a consequence of the seat being occupied and the corresponding seat belt buckle (switch 35) is unlatched. In such an instance, as soon as the tongue is inserted into the seat belt buckle and latched into place, the light 36 will go out. Alternately, a circuit interrupting device, shown as 37, may be included in the circuit so as to cause light 36 to give an intermittant flashing signal. Either instead of, or in addition to light 36, electric buzzer or sounder 38 can be placed in the circuit. As shown in the circuit diagram, this sounder will give a continuous signal until cut off by the latching of the seat belt buckle. However, if desired, circuit interrupter 37 may be included in the circuit to provide an intermittant sound signal.

Figure 6:
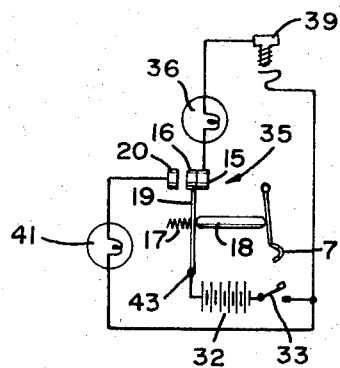
FIG. 6 is a circuit diagram with pictorial representations of the pressure sensitive seat cushion switch and the seat buckle switch, illustrating one way in which the switch of FIG. 3 may be employed to not only indicate when the seat belt has been buckled, but which passenger has "buckled up."

FIG. 6 illustrates the use of the single pole, dual position seat belt buckle switch of FIG. 3 used in a circuit to alert the driver when the seat belt is buckled, and also to indicate by signal (visual as shown, or auditory if desired) when the seat belt is buckled. The latter provision may appear superfluous in the single unit shown, but in multiple units, it is quite advantageous, as it can indicate to the driver specifically which passenger has buckled up. The single pole, dual position switch 35 of this figure comprises: electric contact points 15, 16 and 20, lever 19 (permitting central contact point 16 to make an electrical connection with either contact point 15 or 20), spring biasing means 17 (normally urging contact point 16 into contact with fixed point 15), biased actuating lever 7, slideably disposed pin 18, and spring biasing means 17. In the figures to follow, all these components are grouped under numeral 35, representing the unitized single pole, dual position seat belt buckle switch.

In this FIG. 6, ignition switch 33 is open, as is pressure sensitive switch 39 in the seat cushion. When a passenger is seated switch 39 is closed. When the ignition switch 33 is on, signal 36 is activated because contact point 16 is urged against contact point 15 by the bias of spring 17 against pivotable arm 19. The circuit through signal device (light bulb) 36 is therefore complete, indicating that the safety seat belt is not buckled. Pivotable arm 19 swings on pivot point 43, to bring contact point 16 either into contact with contact point 15 or 20, depending on the direction of the force applied.

If the tongue is inserted into the buckle as in FIG. 1, its tip presses against the curved end of pivotable arm 7, first breaking the circuit to light bulb 36 on the dashboard, then momentarily forcing the arm and contact point 16 attached thereto into contact with contact point 20. This now completes the circuit including light bulb 41, also mounted on the dashboard (as one of several, each representing a seat in the vehicle). As the tongue is engaged by latch 10, however, it moves back toward the opening of the buckle a small fraction of an inch, and in doing so, causes the contact between points 20 and 16 to break, thus breaking the circuit and extinguishing light bulb 41. The driver now knows that the particular passenger in the seat corresponding to light bulb 41 is buckled up.

Figure 7:
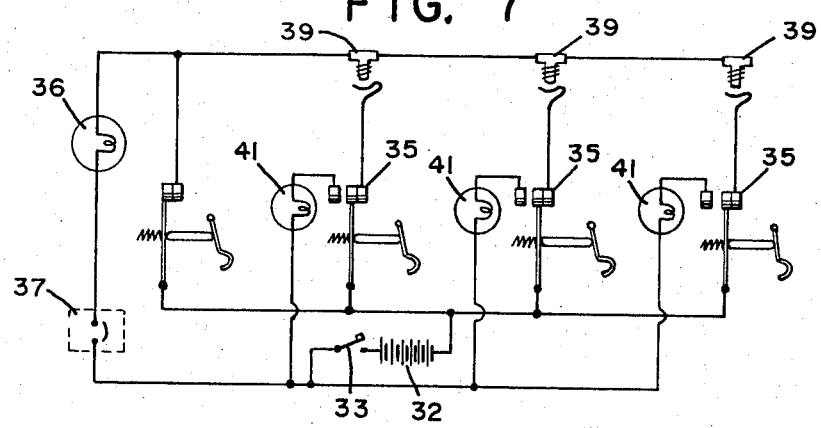
FIG. 7 is a similar circuit diagram illustrating the principle of FIG. 6, wherein the switch of FIG. 3 may be used in a vehicle carrying several passengers. The driver is alerted as each passenger buckles his seat belt, and also when the seat belts of all occupied seats have been buckled.

FIG. 7 illustrates by circuit diagram the same arrangement described for FIG. 6, except that it includes the switches for a driver and three passengers.

For purposes of illustration, suppose all seats are occupied. The ignition switch 33 is closed, all pressure sensitive switches are closed, and signal device 36

(light, buzzer or bell) receives current from the service battery 32. It will be noted that there is no pressure sensitive switch or circuit for a light bulb 41 in the first position. This represents the driver's seat belt switch, and has only two contacts, 15 and 16. Obviously, a pressure sensitive switch and location light bulb 41 are unnecessary for the driver.

Signal 36 is on, and light bulbs 41 are off. Signal 36 indicates that at least one passenger (or the driver) is unbuckled. As each passenger buckles up, his signal light 41 on the dashboard flashes momentarily, indicating that he has buckled. If one or more passengers (or the driver) has failed to buckle up, signal 36 remains on, and the driver knows from the flashing of lights 41, corresponding with each seating position, which passenger or passengers have failed to buckle up. When all passengers have buckled, all circuits are open, and all signals or light bulbs are out. If while driving, anyone unbuckles his or her seat belt, the driver is again alerted by signal 36.

If desired, a circuit interrupting device 37 may be included, which will cause signal 36 to provide an interrupted attention-getting signal.

Although many different circuits may be applied to the buckle-switch of this invention, it should be noted that the circuit used does not place signal device 36 in series with light bulbs 41, to thereby reduce the electric current to each when both are simultaneously activated.

Figure 8:
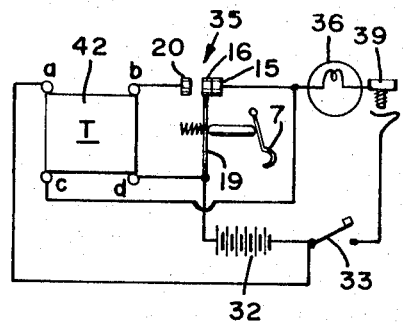
FIG. 8 is a similar circuit diagram illustrating one way in which an electric timer may be included in the circuit, to short circuit the switch points in their open position after a selected period of time, to actuate the signal even when the safety belt is properly buckled.

FIG. 8 illustrates a circuit which includes a timing device or delayed action switch 42. Such devices are commercially available. In FIG. 8, a current impressed between terminals a and b, even momentarily, will set the timer, so that, after a preselected time, preferably about 2 hours, an internal electrical connection will be made between terminals c and d. If while such an electrical connection exists, current is again applied to terminals a and b, the connection between c and d will be broken, to be remade at the expiration of the time cycle of the chosen timer. It will be noted that in the circuit shown, the timer will short-circuit contact points 16 and 15 at the end of its timing cycle.

If the ignition switch 33 is on (and any other switches included in the circuit such as a torque converter switch), and if the pressure sensitive switch is on, as a result of the weight of a passenger seated on the cushion containing said pressure-sensitive switch, and further if the seat belt has not been buckled, the contact points 15 and 16 will be together, completing the circuit to signal device 36. If now the passenger inserts the tongue of the safety belt into the buckle, the tip of the tongue acting against biased actuating lever 7, will separate points 15 and 16, breaking the circuit. As the tip of the tongue is urged into the buckle, it will force the actuating lever further, causing slideable pin 18 to move pivotable arm 19, and contact point 16, momentarily into contact with contact point 20. This closes the circuit through points a and b of the timer, thus breaking electrical connection between c and d for the cycle period of the timer. As the tongue is locked into place by latch member 10 (FIG. 1), it retracts a small fraction of an inch so that there is no electrical contact between any of the three contact points. Signal 36 is now deactivated, indicating that the passenger is buckled up. At the end of the timer's cycle, however, an internal switch connects terminals c and d, closing the circuit and activating signal device 36. Generally a passenger would not ride continuously for more than the selected cycle of the timer, but if the signal should go on while the passenger is properly buckled, all he need do is press the tongue further into the buckle, which would instantly reset the timer for another cycle, and cut off the signal device.

Figure 9:
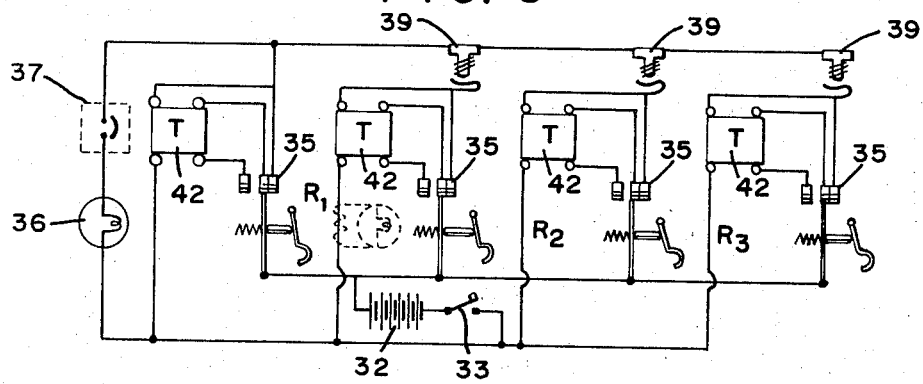
FIG. 9 is a similar circuit diagram illustrating the principle of FIG. 8 wherein the switch of FIG. 3 may be used in a vehicle carrying several passengers.

FIG. 9 is a multiple circuit for a vehicle, employing the principle of FIG. 8. As with FIG. 7, the driver's seat is not equipped with a pressure sensitive switch 39.

The main reason for employing timing devices is to discourage the practice of latching the safety belt, then stuffing it beside or behind the seat to defeat its purpose. If this is done, the signal soon indicates that one or more safety belts are not properly buckled, even if the tongue is latched in the buckle.

As with FIG. 7, a circuit interrupter or "flasher" 37 may be installed to make the signal more effective. Also, as with FIG. 7, it will be noted that the timing devices in the circuit are not in series with the signaling device, which would limit the amount of current available for the timers. If it is desired to incorporate the location-lights of FIG. 7 into the circuit of FIG. 9, it is only necessary to place resistances in the circuit at points $R^1$, $R^2$ and $R^3$ as shown in phantom at $R^1$, and then place a light bulb across the resistance having a voltage demand substantially equal to the drop in potential across the selected resistance. In any case, such resistances can be used advantageously to restrict the current flow to the timing devices.

DESCRIPTION OF THE PREFERRED EMBODIMENT

In a typical operation the warning system functions in the following manner. The passengers enter the car. The pressure sensitive switches in the occupied seat cushions are urged into a closed position by the weight on the cushions. The driver turns on the ignition. This switch is included in the circuit or alternately its turning actuates a parallel acting switch in the warning system circuit. Since the unlatched buckles corresponding to the closed pressure sensitive switches are in closed position, the dashboard light signal and/or the electric sounding device will indicate that one or more seat belt buckles are not in use. Of course, if a switch is included in the circuit which is placed in closed position when the torque converter or transmission is placed into a driving position, then the signal will be delayed until the transmission is placed in a driving gear. As the tongue of each seat belt is inserted and locked into its corresponding buckle, the switch contained therein will be moved to its open position; however, so long as any one seat buckle is unlatched which corresponds to a pressure sensitive switch that is in closed position, the unlatched condition of the remaining buckle will be indicated by the signal device. When all buckles have been latched corresponding to the occupied seats, the circuit will be broken and the light and/or electric sounder will be switched out of operation. In the case of the unoccupied seats the open pressure sensitive switches will inactivate the corresponding seat belt buckle switch so that its unlatched condition will not register.

In another embodiment, which involves FIG. 3 of the drawings, a third contact is included in each buckle switch so that when the tongue is first inserted the centrally located contact is momentarily urged in opposition to the biasing means against the third contact point; thus, momentarily closing a separate circuit. As the hand is removed from the tongue, the tongue slips back the fractional part of an inch to its fully latched position and the central contact point is placed in an intermediate position so that both the warning system circuit and the separate circuit are open. This separate circuit may be used advantageously to activate one of several different electric devices. This circuit can include a small dashboard light 41, one for each buckle, so that, as a group of passengers buckle their seat belts the driver can determine by watching this panel of lights which buckles have been latched and which have not. Lights can be placed on the dashboard behind translucent covers or covers carrying the number corresponding to the position in the vehicle from which the signal originates. Alternately, electromagnetically activated digital signaling devices can be employed.

In another variation, this separate circuit can be used to start an electric timing device 42, which after a predetermined period of time, preferably over 2 hours, closes the warning system circuit irrespective of the condition of the seat belt buckle switch thus alerting the driver to make a check of his passengers. If by any chance the signal system should be switched on by such a timing device while the buckles were properly latched, it would only be necessary for the individual whose timer has caused the signal, to momentarily push the tongue tightly into the buckle to thus reset the timer for another preselected period of time. Such an arrangement would serve to discourage the attempt of a passenger to place a buckle permanently out of service by inserting the tongue and placing the latched buckle behind him or forcing it between the seat cushions. Although such timers may operate in a number of different ways, a satisfactory timing device may be "set" by impressing a momentary current across two terminals $a$ and $b$. By electromagnetic or motor means, a biased gear train with escapement is thereby wound or activated, which simultaneously opens an internal switch across two other terminals $c$ and $d$. This switch is mechanically closed at the end of the timer's "cycle" or time-period built into the mechanism.

In another timer, a electrically driven rotating member is continuously in operation, and the impressed current merely sets the positions of contact points for delayed electrical contact.

In any case, the timer is a delayed action switch which is "set" by the momentary application of an electric current.

Although it is essentially impossible to devise a system which will force an individual to use a seat belt who is determined not to do so, still, the system of the present invention would prevent a passenger from putting the system out of service by tying a knot in the belt so that it could not be fully retracted. It is important that the passenger actually be buckled in, and the system of the present invention is switched to the off position when this is done.

This invention has been described in an illustrative manner. It is to be understood that the terminology which has been used is intended to be in the nature of words of description rather than of limitation.

Obviously, many modifications or variations of the present invention are possible in the light of the above teachings. It is, therefore, to be understood that within the scope of the appended claims the invention may be practiced otherwise than as specifically described.

I claim:

1. A vehicle safety seat belt warning system comprising:
   a. a seat belt buckle having an opening for receiving a tongue at one end, and with the other end attached to a seat belt;
   b. a tongue configured for insertion in the buckle, and attached to another seat belt;
   c. latching means within the buckle for engaging the tongue, and means for manually releasing the latching means;
   d. a single pole, dual position electric switch disposed within the buckle, biased to a first, normally closed circuit position, and movable momentarily to a second closed circuit position by the tip of the inserted tongue, and thereafter maintained in an open circuit condition between the first and second positions by the tip of the latched tongue;
   e. said seat belt attached to the buckle having incorporated therewith, flexible electric conductors for including the single pole, dual position switch in electric circuits;
   f. a first electric circuit including the first normally closed position of the single pole, dual position switch, an electrically activated signal device, a source of electric energy, and at least one additional switch for opening or closing the circuit;
   g. said signal device as a consequence of the circuit being completed, being activated when said additional switch is placed in closed position, and the single pole, dual position switch has not been opened by engaging the tongue in the buckle;
   h. a second electric circuit including the second closed circuit position of the single pole, dual position switch, an electric device and the source of electric energy, whereby when the tongue is manually inserted all the way into the buckle, it moves the single pole, common to both circuit positions, against its bias, into the second closed circuit position, and by permitting a momentary flow of current, activates the electric device of the second circuit, and when the tongue is latched into place and the manual inwardly-applied pressure on the tongue and buckle is relaxed and removed, the single pole, dual position switch is maintained by the tip of the tongue in an open circuit condition between the first and second positions, and both the electric signal device of the first circuit and the electric device of the second circuit are deactivated, indicating to the driver that the tongue is latched with the buckle, and the passenger has buckled up.

2. The vehicle safety belt warning system of claim 1 wherein a pressure sensitive switch is embedded in each safety belt-equipped seat within the vehicle, and a first set of integrated circuits are provided, one for the first closed circuit position of each single pole, dual position switch and each sensitive switch, with the electric signal device and the source of electrical energy common to all these circuits, and a second set of integrated circuits, one for the second closed circuit position of each single pole, dual position switch and each electric device, with the source of electrical energy common to all these circuits.

3. The vehicle safety seat belt system of claim 2 wherein the first position of the single pole, dual position switch disposed within the buckle is connected in series with the pressure sensitive switch in the seat cushion of the corresponding seat, but said sets of serially connected switches are connected in parallel with each other and with any buckle switches which are not paired with pressure sensitive switches, whereby if at least one seat belt has not been buckled in an occupied seat and the ignition switch and any other additional switches are closed, the electrically activated signal device will continue to respond.

4. The vehicle safety seat belt warning system of claim 2 wherein the flexible electrical conductors incorporated with the seat belt attached to the buckle, are three in number and are embedded in the seat belt.

5. The vehicle safety seat belt warning system of claim 2 wherein the electric device is an electric light mounted on the dashboard of the vehicle for alerting the driver.

6. The vehicle safety seat belt warning system of claim 2 wherein the electric device is a digital indicator which flashes the number of the seat corresponding to that in which the seat belt is being buckled by the passenger.

7. The vehicle seat belt warning system of claim 2 wherein the electric device is a timer which is activated to its set position by the momentary flow of current, whereupon the timer will short circuit the first position of the single pole switch, after the expiration of the time cycle of the timer, to then activate the signal device.

8. The vehicle safety seat belt warning system of claim 1 wherein an electric current interrupting device is included in the first circuit to render the signal intermittent.

9. A vehicle safety seat belt warning system comprising:
  a. a seat belt buckle having an opening for receiving a tongue at one end and with the other end attached to a seat belt;
  b. a tongue configured for insertion in the buckle and attached to another seat belt;
  c. latching means within the buckle for engaging the tongue and means for manually releasing the latching means;
  d. a single pole, dual position, electric switch disposed within the buckle, biased to a first normally closed circuit position, and movable momentarily to a second closed circuit position by the tip of the inserted tongue and thereafter maintained in an open circuit condition between the first and second positions by the tip of the latched tongue;
  e. said seat belt attached to the buckle having incorporated therewith flexible electric conductors for including the single pole, dual position switch in electric circuits;
  f. a first electric circuit including the first normally closed position of the single pole, dual position switch, an electrically activated signal device, a source of electrical energy, and at least one additional switch for opening or closing the circuit;
  g. said signal device as a consequence of the circuit being completed, being activated when said additional switch is placed in the closed position, and the single pole, dual position switch has not been opened by engaging the tongue in the buckle;
  h. an electric timing device having a cycle-setting electric mechanism which provides a cycle-setting circuit;
  i. a second electric circuit including the second closed circuit position of the single pole, dual position switch, the cycle-setting circuit of the electric timing device and the source of electric energy, whereby when the tongue is inserted all the way into the buckle, it moves the single pole, common to both circuit positions, against its bias into the second closed circuit position, and by permitting a momentary flow of current, activates the cycle-setting electric mechanism of the timing device in the second circuit, and when the tongue is latched into place and the manual inwardly-applied pressure on the tongue and buckle is relaxed and removed, the single pole, dual position switch is maintained by the tip of the tongue in an open circuit condition between the first and second positions so that no more current is impressed on the cycle-setting circuit of the timing device and the electric signal device of the first circuit is deactivated;
  j. after a period of time established by the time cycle of the electric timing device, said timing device will short circuit the first position of the single pole switch to thereby activate the signal device.

10. The vehicle safety belt warning system of claim 9 wherein electrical resistances are placed in the second circuit with the timer, and a secondary electric signalling device requiring an electrical potential substantially equal to the potential drop of the resistance, is placed across the resistance, whereby when a passenger inserts the tongue into the buckle, the driver of the vehicle will receive a signal corresponding to the seat position of the passenger buckling his seat belt.

11. The vehicle safety belt warning system of claim 1 wherein a pressure sensitive switch is included in each safety belt-equipped passenger seat within the vehicle, said pressure sensitive switch being connected in series with said single pole, dual position electric switch corresponding to said passenger seat and being adapted to be actuated when said passenger seat is occupied.

* * * * *